W. VAN V. HAYES.
BLOW OUT PATCH.
APPLICATION FILED DEC. 5, 1919.
1,352,957.   Patented Sept. 14, 1920.
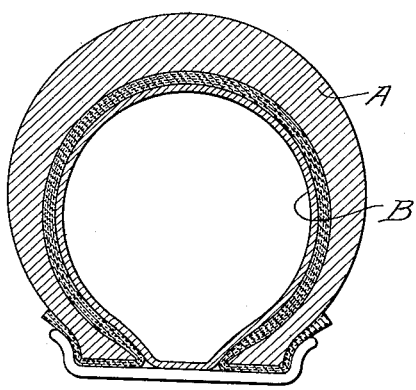
Fig. 1.
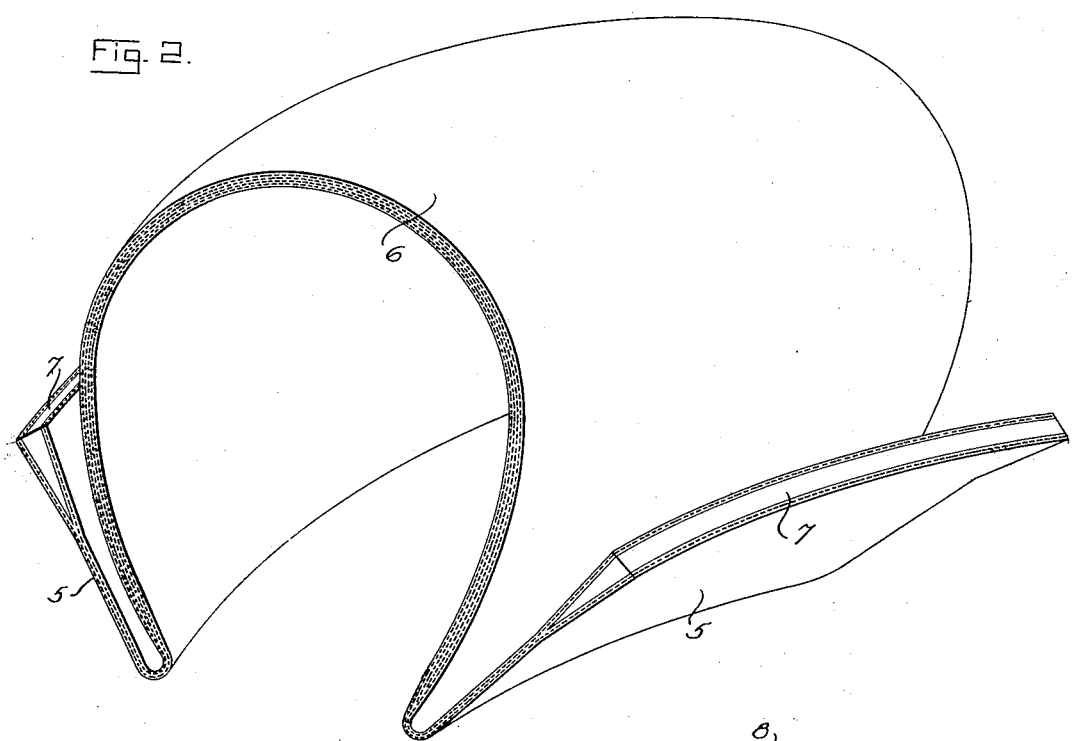
Fig. 2.
Fig. 3.
WITNESSES
INVENTOR
William Van V. Hayes.
BY
ATTORNEYS

UNITED STATES PATENT OFFICE.

WILLIAM VAN V. HAYES, OF NEW YORK, N. Y.

BLOW-OUT PATCH.

1,352,957.

Specification of Letters Patent. Patented Sept. 14, 1920.

Application filed December 5, 1919. Serial No. 342,608.

*To all whom it may concern:*

Be it known that I, WILLIAM VAN V. HAYES, a citizen of the United States, and a resident of the city of New York, borough of Manhattan, county and State of New York, have invented a new and useful Improvement in Blow-Out Patches, of which the following is a full, clear, and exact description.

My invention relates in general to means for repairing pneumatic tires when the outer casing of the same has become weakened, perforated or worn to such an extent that the laminated or otherwise constructed walls of the casing are inadequate to withstand the strains and stresses incident to the inflation of the inner tube and the conditions to which the tire is subjected in use.

I am aware that various so-called blow out patches, inner linings, etc., are offered to the trade as a medium for repairing pneumatic tires. Some of these devices such as the blow out patches are usually intended to be used for repairing or strengthening local imperfections, while others such as inner linings and the like are intended more or less to effect a strengthening throughout the entire circumference of the tire.

According to my invention I propose to realize the advantages of so constructing the device that the same may be used either as a blow out patch or inner lining or the like. However for the purpose of illustration I have selected to show and describe the idea as embodying a blow out patch, and for the purpose of convenience its advantages will be referred to in this light.

As heretofore practised blow out patches are usually made with some means to prevent transverse and circumferential movement of the patch from the tire. Usually the means resorted to to realize this effect comprises flaps or aprons which are provided along the edges of the patch and arranged to coöperate with the tire casing and the rim on which the tire is confined. This coöperation in most instances is nothing more than a biting or clamping effect between the rim and the outer rim portions of the tire with the flaps or aprons confined therebetween. Regardless of the pressure which is brought to bear at this point it has been found in actual practice that the clamping or pinching of the patch aprons does not maintain the patch in its intended position as the same will invariably creep, and in some instances to such an extent that it will become dislodged from strengthening relation with the casing of the tire, with the result that the inner tube will be deprived of the reinforcing effect and will soon blow through the weakened or perforated imperfection in the tire.

The primary object of my invention is to employ a conventional or otherwise constructed type of patch in so far as concerns its body portion, but instead of using the ordinary flaps or aprons I propose to depart from the heretofore accepted arrangement and to so construct the flap that the disadvantages experienced in these conventional forms will be overcome with the result that the patch will not slip, creep or otherwise move from its strengthening relation relative to the tire.

The accompanying drawing illustrates one example of putting the invention into practice and in which, Figure 1 is a cross section of a tire illustrating the application of the invention.

Fig. 2 is a perspective view of a patch constructed in accordance with the invention, and Fig. 3 is a detailed view of the flap or apron showing the modified form of the invention.

Referring to the drawing in detail it often happens that the casing A of the tire becomes weakened or often perforated in various locations in its circumference, thus leaving an inferior confining wall for the inflated inner tube B. Were it not for the fact that the imperfections in the casing usually occur at local points so to speak, it would be necessary to discard the casing. However it so happens that a bruise or other condition will affect the casing at one point leaving the remainder of the tire in a more or less good condition so that by strengthening the point of imperfection by a so-called patch the tire is rendered capable of considerable further service. Now if the patch used is not maintained in strengthening relation relative to the imperfection the inner tube will be exposed and the pressure contained therein will naturally blow the same through the imperfection resulting in the destruction of the inner tube.

The theory advanced as to the conventional types of blow out patches is that the flaps or aprons which are clamped or pinched between the rim of the tire will prevent slipping of the patch, but this condition does not prevail in actual practice, as the flaps or aprons of the patches are of an equal thickness throughout.

According to my invention I construct the flaps or aprons 5, of the patch 6 with an enlargement preferably wedge shaped so to speak so that any tendency of the patch to slip will increase the biting or clamping effect of the apron between the rim and the tire, and effect a wedging action which only draws the flaps or aprons in tighter clamping or pinching relation with the rim and the tire.

The enlargement or wedge shaped construction of the flaps or aprons may be realized in various ways, and as for instance in Fig. 2 I have shown some of the laminated layers of the aprons separated and made to receive wedge shaped inserts 7, which may be of rubber or any other suitable material. In Fig. 3 instead of using the inserts 7 the same advantages would be gained by building up the end of the flap preferably wedge shape by a number of layers 8 of laminated material.

Having thus described my invention, I claim,

1. A blow out patch comprising a body portion having oppositely disposed attaching aprons, said attaching aprons being wedge-shaped in cross section.

2. A blow out patch comprising a body portion defined on its opposite side edges with attaching aprons, each of said aprons increasing in thickness toward its outer edge.

3. A blow out patch comprising a body portion having oppositely disposed attaching aprons, each of said attaching aprons being thickened from a substantially central point to the outer edge thereof.

4. A blow out patch, comprising a body having aprons and formed of a plurality of layers of fabric, and inserts between the layers of fabric of the aprons at the outer portions thereof, whereby the aprons will be enlarged at their edges.

5. A blow out patch, comprising a body having aprons and formed of a plurality of layers of fabric, and a wedge-shaped insert between the layers of fabric of the aprons at the outer portions thereof, whereby the said outer portions of the aprons will be wedge-shaped in cross section.

WILLIAM VAN V. HAYES.